(12) United States Patent
Uchida

(10) Patent No.: US 7,436,614 B2
(45) Date of Patent: Oct. 14, 2008

(54) DATA STORAGE DEVICE AND DATA STORAGE DEVICE CONTROL

(75) Inventor: Hiroshi Uchida, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 318 days.

(21) Appl. No.: 11/143,511

(22) Filed: Jun. 1, 2005

(65) Prior Publication Data

US 2005/0270678 A1    Dec. 8, 2005

(30) Foreign Application Priority Data

Jun. 2, 2004    (JP)    ............................. 2004-164540

(51) Int. Cl.
G11B 15/14    (2006.01)

(52) U.S. Cl. .................. 360/64; 360/63; 360/78.04; 360/75

(58) Field of Classification Search ................. None
See application file for complete search history.

(56) References Cited

U.S. PATENT DOCUMENTS

| | | | |
|---|---|---|---|
| 5,606,470 A | | 2/1997 | Shioya et al. |
| 5,742,443 A | * | 4/1998 | Tsao et al. ..................... 360/50 |
| 5,784,220 A | * | 7/1998 | Nishimura et al. ........ 360/78.14 |
| 6,034,837 A | * | 3/2000 | Purkett .................... 360/78.04 |
| 6,081,399 A | * | 6/2000 | Lee et al. ....................... 360/75 |
| 6,097,563 A | * | 8/2000 | Carlson et al. ................. 360/63 |
| 6,105,104 A | * | 8/2000 | Guttmann et al. ............... 711/4 |
| 6,411,454 B1 | * | 6/2002 | Monroe, III .................. 360/63 |
| 6,532,126 B1 | | 3/2003 | Nguyen et al. |
| 6,690,538 B1 | * | 2/2004 | Saito et al. ................ 360/78.08 |
| 6,693,766 B1 | * | 2/2004 | Wilkes et al. ............. 360/78.08 |
| 6,728,054 B2 | * | 4/2004 | Chng et al. .................... 360/63 |
| 6,795,894 B1 | * | 9/2004 | Neufeld et al. .............. 711/113 |
| 6,879,454 B2 | * | 4/2005 | Winarski et al. ............... 360/60 |
| 6,978,345 B2 | * | 12/2005 | Tomaszewski et al. ...... 711/112 |
| 6,992,854 B1 | * | 1/2006 | Gostling .................. 360/77.08 |
| 7,120,726 B2 | * | 10/2006 | Chen et al. ...................... 711/4 |
| 2002/0101675 A1 | * | 8/2002 | Chng et al. .................... 360/63 |
| 2002/0141099 A1 | * | 10/2002 | Ng et al. ........................ 360/75 |
| 2004/0136104 A1 | * | 7/2004 | Chiao et al. .................... 360/31 |

FOREIGN PATENT DOCUMENTS

| | | |
|---|---|---|
| JP | 07-085403 | 3/1995 |
| JP | 07-334801 | 12/1995 |
| JP | 2000-348450 | 12/2000 |

* cited by examiner

*Primary Examiner*—Hoa T. Nguyen
*Assistant Examiner*—Dismery Mercedes
(74) *Attorney, Agent, or Firm*—Townsend and Townsend and Crew LLP; Patrick Duncan

(57) ABSTRACT

Embodiments of the invention provide a data storage device and its control method that are capable of minimizing the possibility of head deterioration while maintaining the minimum required sustained data rate. In one embodiment, each track is divided into three areas (A, B, and C). When a ⅓ track is accessed, the head is changed to access a ⅓ track on the next recording surface. In this instance, LBAs are assigned to disks so that heads Hd0 through Hd4, which access both surfaces of disks 0 and 1, are selected for accessing purposes in the Hd0, Hd1, Hd2, Hd3, Hd0, and Hd1 order while an area selection is made in the area A, area B, and area C order.

14 Claims, 9 Drawing Sheets

$$dT = \frac{Q(I)}{C} - k \cdot (T - T_0)$$

(a)

$$P = A \exp\left(-\frac{Eb}{k_B \cdot T}\right)$$

(b)

(c)

DATA STORAGE DEVICE AND DATA STORAGE DEVICE CONTROL

CROSS-REFERENCES TO RELATED APPLICATIONS

This application claims priority from Japanese Patent Application No. JP2004-164540, filed Jun. 2, 2004, the entire disclosure of which is incorporated herein by reference.

BACKGROUND OF THE INVENTION

The present invention relates to a data storage device that comprises a plurality of disks and heads for reading/writing data on the recording surfaces of disks and a method for controlling such a data storage, and more particularly to a storage device that is capable of preventing its heads from deteriorating during a continuous data read/write and a method for controlling such a storage device.

Well-known data storage devices use an optical disk, magnetic tape, and various other types of media. Among others, a hard disk drive (HDD) is widely used as a storage device for use with a computer and has become one of the storage devices essential to the present-day computer system. Due to its excellent characteristics, the hard disk drive has found increasingly wide applications, including a motion picture recorder/player, a car navigation system reader/recorder, and a removable memory for use in a digital camera.

Owing to recent recording density enhancement, the hard disk drive uses an MR head, which is based on a magnetoresistive (MR) effect, a GMR head, which is based on a giant magnetoresistive (GMR) effect, or an MR read/thin-film write composite head (hereinafter referred to as an MR head). The MR head employs a thin-film head for writing purposes and a DSMR (dual stripe magnetoresistive) head, which comprises two MR elements to produce excellent effects of suppressing thermal asperity (TA) arising out of the contact with a medium, for reading purposes.

In the MR head, the sense current for the read head flows to an extremely thin MR element film. Therefore, the element life is adversely affected because, for example, the element fractures due to temperate-rise-induced electromigration acceleration. The magnetic reader/writer disclosed, for instance, by Japanese Patent Laid-Open No. 3216943 (Patent Document 1) is provided with means for sequentially switching from one magnetic head to another at the time of following so that the cumulative total of the read time, seek time, and positioning data read time for following does not vary from one magnetic head to another. In other words, the magnetic reader/writer described in Patent Document 1 memorizes the read time of each head, and switches from one magnetic head to another so that, for example, the magnetic head number sequentially increases from the minimum to the maximum in accordance with the cumulative total read time and in order to prevent an electrical current from being supplied to a single head for an extended period of time. When the maximum magnetic head number is reached, the magnetic reader/writer switches from one magnetic head to another in an opposite direction so that the magnetic head number sequentially decreases from the maximum to the minimum.

In the hard disk drives for IT use, the head seek operation count and head change count are generally decreased to obtain the maximum sustained data rate. Further, LBAs (logical block addresses) are successively assigned to the cylinder circumference so as to reduce the rotational delay time for head seek operations and head changes. A typical idea of assigning LBAs to a plurality of magnetic disk storage areas will now be described. FIGS. 8 and 9 illustrate a conventional LBA assignment method. FIGS. 8(*a*) and 9(*a*) are schematic diagrams that illustrate head changes. FIGS. 8(*b*) and 9(*b*) indicate the relationship among the cylinder numbers, head numbers, and LBAs assigned to disks.

FIGS. 8(*a*) and 8(*b*) show an example in which one track seek is performed so that frequent head changes are made. As indicated in FIGS. 8(*a*) and 8(*b*), head 0 writes data into one track (or reads data from one track) on one recording surface of disk 0. Next, head 1 writes data into one track (or reads data from one track) on the other recording surface of disk 0. In this manner, the head number sequentially changes, for instance, from the lowest (Hd: 0) to the highest (Hd: 3) after each change in the track of each cylinder. After the highest head number is reached, the head number sequentially changes from the highest (Hd: 3) to the lowest (Hd: 0). This manner of LBA assignment to disk recording areas (data format) is employed when the time required for a head change is shorter than required for one track seek or when head deterioration is to be prevented.

In marked contrast to FIGS. 8(*a*) and 8(*b*), FIGS. 9(*a*) and 9(*b*) show an example in which one track seek is frequently performed to reduce the number of head changes. As indicated in FIGS. 9(*a*) and 9(*b*), head 0, which corresponds to one recording surface of disk 0, is used to perform a write in relation to cylinders 7 through 0. The head is then changed to head 1. Head 1 is used to perform a write in relation to cylinders 0 through 7 of the other recording surface of disk 0. In this manner, the number of head changes is reduced to increase the sustained data rate. This method is employed when, for instance, the time required for one track seek is shorter than required for a head change. As described earlier, recently used hard disk drives have a narrow track width due to an increase in the recording density so that the time required for one track seek is reduced. Therefore, the method shown in FIGS. 9(*a*) and 9(*b*) is used to raise the sustained data rate.

The format described above is a data format for conventional hard disk drives for IT use. At present, however, the data format including the zone format for IT use is used as is for AV (audiovisual) hard disk drives as well.

BRIEF SUMMARY OF THE INVENTION

However, the technology disclosed by Patent Document 1 is not ideal for AV hard disk drives, which differ from IT hard disk drives in specifications. More specifically, the AV hard disk drives continuously handle an extremely large amount of data during a read/write. Therefore, the head usage rate of the AV hard disk drives is substantially higher than that of the IT hard disk drives. The technology disclosed by Patent Document 1 assigns LBAs to the hard disk drives as indicated in FIGS. 8(*a*) and 8(*b*). When the head number sequentially changes from the highest to the lowest and then from the lowest to the highest, the heads having the highest number or the lowest number may be successively used so that premature head deterioration results.

At present, the AV hard disk drives use the same data format as the IT hard disk drives. However, it is important that the AV hard disk drives read and write image data without dropping frames. The sustained data rate prevailing under the worst conditions is determined as the most important performance characteristic. Therefore, the performance specifications for the AV hard disk drives greatly differ from those for the IT hard disk drives. More specifically, the hard disk drive recorders and other hard-disk-drive-based AV products are designed to read and write image data without dropping frames under the worst performance conditions. When the AV hard disk drives are selected or their specifications are worked out, due consideration is given to check whether image data are properly read and written without frame drops.

Further, the amount of data to be read/written by the AV hard disk drives is incomparably larger than that to be read/written by conventional IT hard disk drives. In addition, the AV hard disk drive reads/writes the data continuously for a long period of time so that the heads are heavily loaded. It is therefore anticipated that the head may prematurely deteriorate. Furthermore, it is demanded that the home appliances incorporating an AV hard disk drive be warranted for a period that is more than two times longer than the warranty period for IT products such as a PC.

On the other hand, the conventional IT hard disk drives are requested to offer the highest sustained data rate as described earlier. Therefore, no attempt has been made to increase the number of head changes beyond the limit of the normally adopted data format, which is shown in FIGS. 8(a) and 8(b). If such IT hard disk drives are used as AV hard disk drives, the obtained sustained data rate is higher than necessary, but essential functions are missing. More specifically, the AV hard disk drives differ from the IT hard disk drives because the former hard disk drives use their heads for a long period of time when they read or write movie data or other similar data. Therefore, the heads are likely to deteriorate.

The present invention has been made to solve the above problems and provides a data storage device and its control method that are capable of minimizing the possibility of head deterioration while maintaining the minimum required sustained data rate.

In accordance with an aspect of the present invention, a storage device comprises one or more disks, heads provided respectively for a plurality of recording surfaces of the one or more disks, and a head controller for exercising switchover control over the heads so that a successive access area in which the heads successively access respective recording surfaces does not exceed one track.

The storage device which has a plurality of heads that correspond to a plurality of recording surfaces, uses the heads intermittently, and not successively, for a read/write by ensuring that the successive access area of each head does not exceed one track. The head controller can exercise control so that the successive access area of at least one head in one cylinder is less than one track. Each of the plurality of recording surfaces has tracks, which are divided into two or more partial areas, and the head controller can exercise control so that the successive access area of each head in one cylinder is the partial area. Each track is divided into partial areas. After the partial areas are accessed, the head can be changed to access the partial areas on another recording surface.

The storage device may further comprise an address converter for converting a first address, which is transferred from a host device, into a second address, which is required for gaining access to the recording surfaces. The head controller can control each head's access to the associated recording surface in accordance with the second address. When the address converter effects an address conversion, the positional relationship between the first address and second address can be set so that a head change occurs within one track.

The head controller can switch from one head to another in the same order. When the head controller changes the head in the same order, all of the heads are equal in the access time. The head controller can provide the successive access area that is the partial area or two adjacent partial areas on the same recording surface. The partial areas may be sequentially accessed to change the head. Further, the partial areas can be successively accessed if the rotational delay time arises.

Each of the recording surfaces has (N−1) partial areas where N is the number of heads (N is 2 or greater integer). The head controller uses the partial area as the successive access area and can switch to another head each time one head accesses the partial area. When each recording surface is divided into (N−1) partial areas, the rotational delay time does not arise so that the head can be changed with high efficiency. Each of the recording surfaces has a plurality of zones, which differ in the number of the partial areas within a track. Further, the outer tracks on each of the recording surfaces have a larger number of the partial areas than the inner tracks. Therefore, the outer tracks, which provide a higher sustained data rate than the inner tracks, can be provided with an increased number of partial areas to increase the number of head changes.

A storage device control method according to another aspect of the present invention controls a storage device having a plurality of heads that are provided respectively for a plurality of recording surfaces of one or more disks. The method comprises the step of receiving data transferred from a host device, and the step of exercising switchover control over the heads so that a successive access area in which the heads successively access respective recording surfaces does not exceed one track when the data is to be written.

The storage device and its control method according to the present invention change the head within one track for each of a plurality of recording surfaces. Therefore, the present invention provides a data storage device and its control method that are capable of minimizing the possibility of head deterioration while maintaining the minimum required sustained data rate.

BRIEF DESCRIPTION OF THE DRAWINGS

FIG. 4(a) is a schematic diagram that illustrates a disk. FIG. 4(b) is a schematic diagram that illustrates the relationship among the cylinders, heads, and disks. FIG. 4(c) is a schematic diagram that shows how LBAs are arranged in relation to CHS values.

FIG. 6(a) is a schematic diagram that illustrates a disk. FIG. 6(b) is a schematic diagram that illustrates the relationship among the cylinders, heads, and disks. FIG. 6(c) is a schematic diagram that shows how LBAs are arranged in relation to CHS values.

FIG. 8(a) is a schematic diagram illustrating head changes. FIG. 8(b) illustrates the relationship among cylinder numbers, head numbers, and LBAs to be assigned to disks.

FIG. 9(a) is a schematic diagram illustrating head changes. FIG. 9(b) illustrates the relationship among cylinder numbers, head numbers, and LBAs to be assigned to disks.

DETAILED DESCRIPTION OF THE INVENTION

Figure 1:
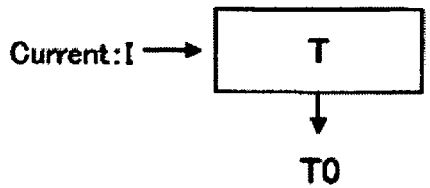
FIG. 1(a) illustrates a model of temperature T, which prevails when current I flows to MR element Hd of a head.
FIG. 1(b) illustrates transition probability P with which the status changes from state A to state B at temperature T.
FIG. 1(c) is a graph in which the data read amount is plotted along the horizontal axis and the cumulative occurrence count of an electromigration-induced failure is plotted along the vertical axis. This graph shows simulation results, which indicate a failure rate comparison between successive reads and intermittent reads.
Figure 1:
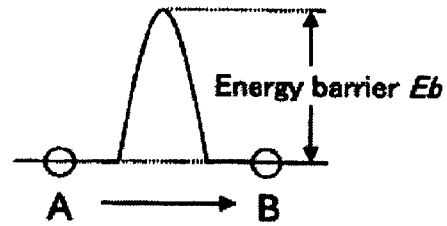
Figure 1:
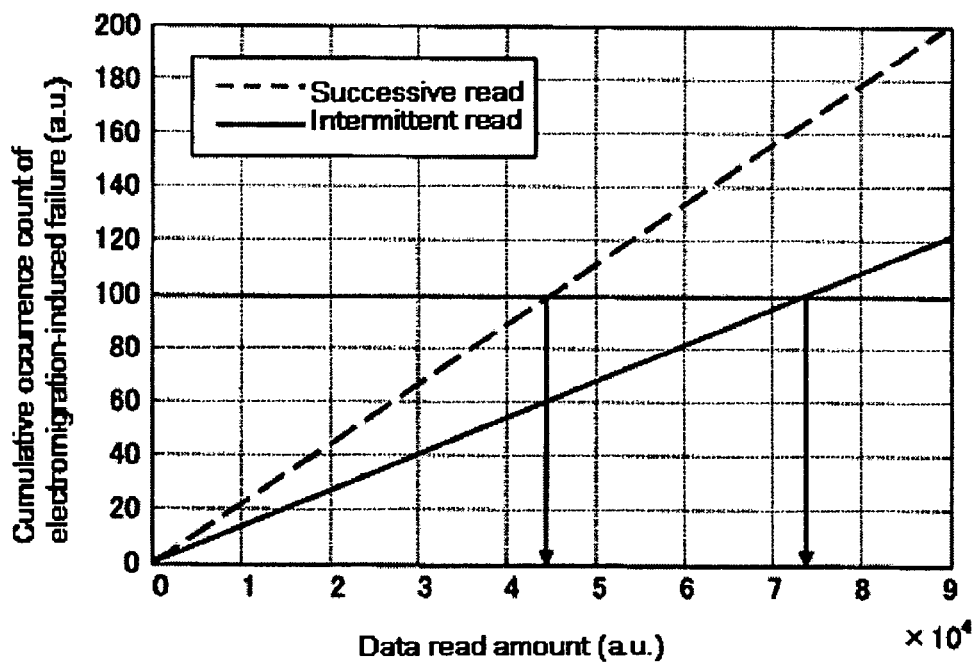

An embodiment of the present invention will now be described in detail with reference to the accompanying drawings. The present embodiment applies to AV hard disk drives that read/write a large amount of data continuously for a long period of time. In the present embodiment, the physical arrangement (data format) of a data write location is carefully determined to meet AV product performance requirements, minimizes the possibility of head deterioration, and enhances the AV product reliability.

In the present embodiment of a data read/write in a hard disk drive having magnetic heads that are provided for a plurality of recording surfaces of a plurality of disks, the LBAs, which are the first addresses fed from a host device, are arranged in an unprecedented manner in relation to the cylinder numbers, head numbers, and sector numbers (CHS), which serve as the second addresses required when a plurality of heads access the recording surfaces. In other words, the physical disk format is carefully determined so that the same head is not selected for a long period of time. This prevents the prolonged use of the same head, thereby minimizing the possibility of head deterioration.

The relationship between prolonged head use and head deterioration will now be described with special reference to the head deterioration prevention effect that is produced when a particular head is not used for a long period of time. The explanation to be given also includes the description of the results of a simulation that was conducted using a simple model. When the head is changed frequently to prevent the electrical current from flowing to a single head for a long period of time, it is possible to avoid premature head deterioration arising out, for instance, of electromigration.

FIG. 1(a) illustrates a model of temperature T, which prevails when current I flows to MR element Hd of a head. FIG. 1(b) illustrates transition probability P with which the status changes from state A to state B at temperature T. FIG. 1(c) is a graph in which the data read amount (arbitrary unit (a.u.)) is plotted along the horizontal axis and the cumulative occurrence count of an electromigration-induced failure (arbitrary unit) is plotted along the vertical axis. This graph shows simulation results, which indicate a failure rate comparison between successive reads and intermittent reads.

The symbol T0 in FIG. 1(a) represents the ambient temperature (room temperature). The symbol dT represents a temperature change that occurs when the current I-induced heat quantity is Q(I), the specific heat is C, and the thermal conductivity is k. In FIG. 1(b), the symbol Eb represents an energy barrier, the symbol kB represents the Boltzmann constant, and the symbol P represents the transition probability with which the status changes from state A to state B beyond the energy barrier Eb. The transition probability P indicates the probability with which a failure occurs at temperature T.

FIG. 1(c) shows the simulation results of electromigration-induced cumulative failure occurrence count. For the simulation, the temperature change dT and failure occurrence probability P, which are indicated in FIGS. 1(a) and 1(b), respectively, were used. The curve drawn by a broken line indicates a failure rate that prevails under the worst conditions where no head change occurs, that is, when the heads are used for successive read operations. The data indicated by a solid line is an example to which the present invention is applied. It indicates a failure rate prevailing on the assumption that the heads are used under conditions where the same head is read intermittently over an area less than one track due to head changes. If, for instance, the lifetime is equivalent to a failure occurrence count of 100, an intermittent head use reduces the head temperature rise rate, thereby decreasing the failure rate and cumulative failure occurrence count.

For the IT hard disk drives, which are compelled to provide an increased sustained data rate, frequent head changes may not be favorable because they will reduce the sustained data rate. On the other hand, it is demanded that the AV hard disk drives have a sustained data rate that is adequate for reading and writing image data without dropping frames. In a situation where, for instance, an unnecessarily high sustained data rate is not called for, frequent head changes may not cause a problem for the AV hard disk drives. When the IT hard disk drives are used, successive data read/write operations are not frequently performed. However, the amount of data handled by the AV hard disk drives is incomparably larger than that handled by the IT hard disk drives. Therefore, the AV hard disk drives frequently perform successive read/write operations for a long period of time. As a result, the heads of the AV hard disk drives may rapidly deteriorate.

In accordance with the above findings, the present invention proposes a data storage device and its read/write method that are suitable, for instance, for AV equipment use, and capable of minimizing the possibility of head deterioration while maintaining the minimum required sustained data rate even when a large amount of data is read/written.

In the case of an AV hard disk drive that handles stream data and the like, for example, the LBAs to be assigned to disk physical addresses (data format) are carefully determined to equalize the individual head use times by making as many head changes as possible while maintaining the minimum sustained data rate required for avoiding AV data frame drops. In a region where the obtained sustained data rate is higher than required, the use of this format increases the head change frequency, thereby reducing the continuous power application time for each head, minimizing the possibility of head deterioration, and providing enhanced reliability.

The hard disk drives generally use a zone format in which the number of data sectors is relatively large in the outer tracks and relatively small in the inner tracks. Therefore, the sustained data rate is high in the outer tracks and low in the inner tracks. The sustained data rate changes in a staircase pattern because the data rate varies from one zone to another.

As described above, the current hard disk drive recorders and other hard disk drive based AV products use the same format as the IT hard disk drives. Therefore, the hard disk drives for use in AV products are designed with reference to the inner track performance, which provides the lowest sustained data rate. It means that the non-inner tracks of the hard disk drives for use in AV products exhibit unnecessarily high performance characteristics. Therefore, the present embodiment uses the outer track performance, which provides an extra high sustained data rate, for minimizing the possibility of head deterioration.

Figure 8:
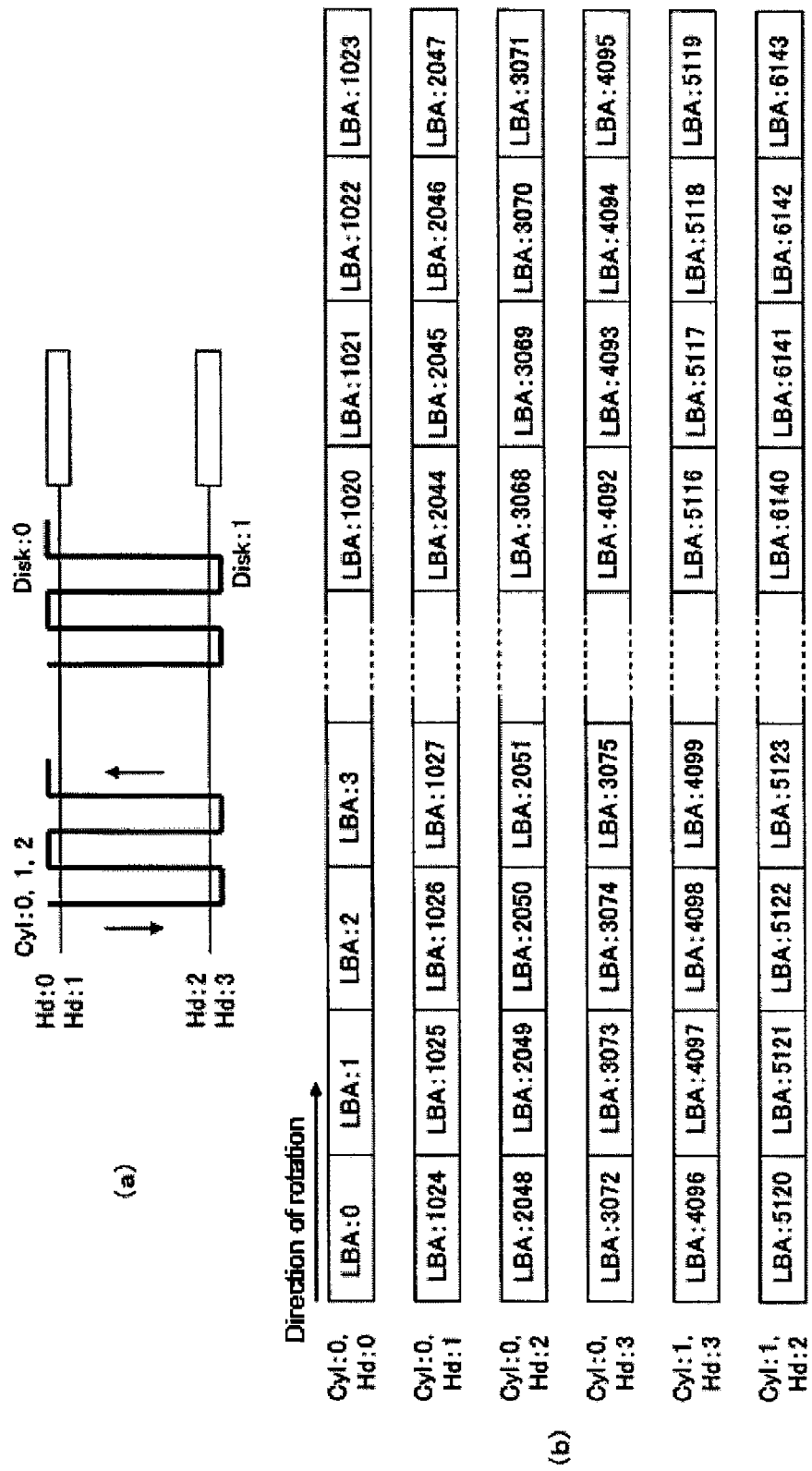
FIGS. 8(a) and 8(b) show an example of a conventional LBA assignment method.

More specifically, the hard disk drive according to the present embodiment uses the LBAs fed from the host device so that the successive write or successive read area on each recording surface is not more than one track. After termination of a write or read in relation to a specific area of one recording surface, CHS values are given so that another recording surface is read or written onto. In this instance, a plurality of recording surfaces are sequenced, and the recording surfaces are designated in the accordance with the determined sequence. When, for instance, the heads are selected in order of H0, H1, H2, and so on to Hn, head H0 is selected again after the use of a head having the head number Hn. As indicated in FIGS. 8(a) and 8(b), the heads are conventionally selected in the H0, H1, H2, ..., Hn, Hn, H(n−1), and H(n−2) order for the purpose of achieving a high sustained data rate. In the present embodiment, however, the heads are selected in the H0, H1, H2, ..., Hn, H0, H1, and H2 order. Conventionally, the successive read/write time for heads H0 and Hn is longer than for the other heads. In the present embodiment, however, a head change is always made after a one-track successive write or read for the purpose of preventing the head MR element temperature from rising and minimizing the possibility of head deterioration.

Further, the successive access area for successive write or successive read operations on a recording surface is a partial area (hereinafter referred to as a partial track), which is obtained by dividing a track into a plurality of areas. The successive access area on a recording surface, that is, the successive use of a single head is during a period in which one or adjacent partial tracks are accessed. The LBAs are assigned so as to invoke a head change, that is, to ensure that after completion of access, a partial track on another recording surface is accessed. The head change is then made multiple times even when one track of data is read or written.

If, for instance, the head is changed multiple times while the data in a track is being read, the electrical current supply to each head is intermittent. Therefore, the head temperature returns to normal during such an intermittent electrical current supply. As a result, the probability with which electromigration occurs decreases, thereby increasing the product life and enhancing the reliability. The same deterioration problem occurs with a write head due to a prolonged head use as is the case with a read head. However, when the LBAs are assigned to the disks so that the head frequently changes, the head is also changed during a write for intermittent use with a view toward head reliability enhancement.

Figure 2:
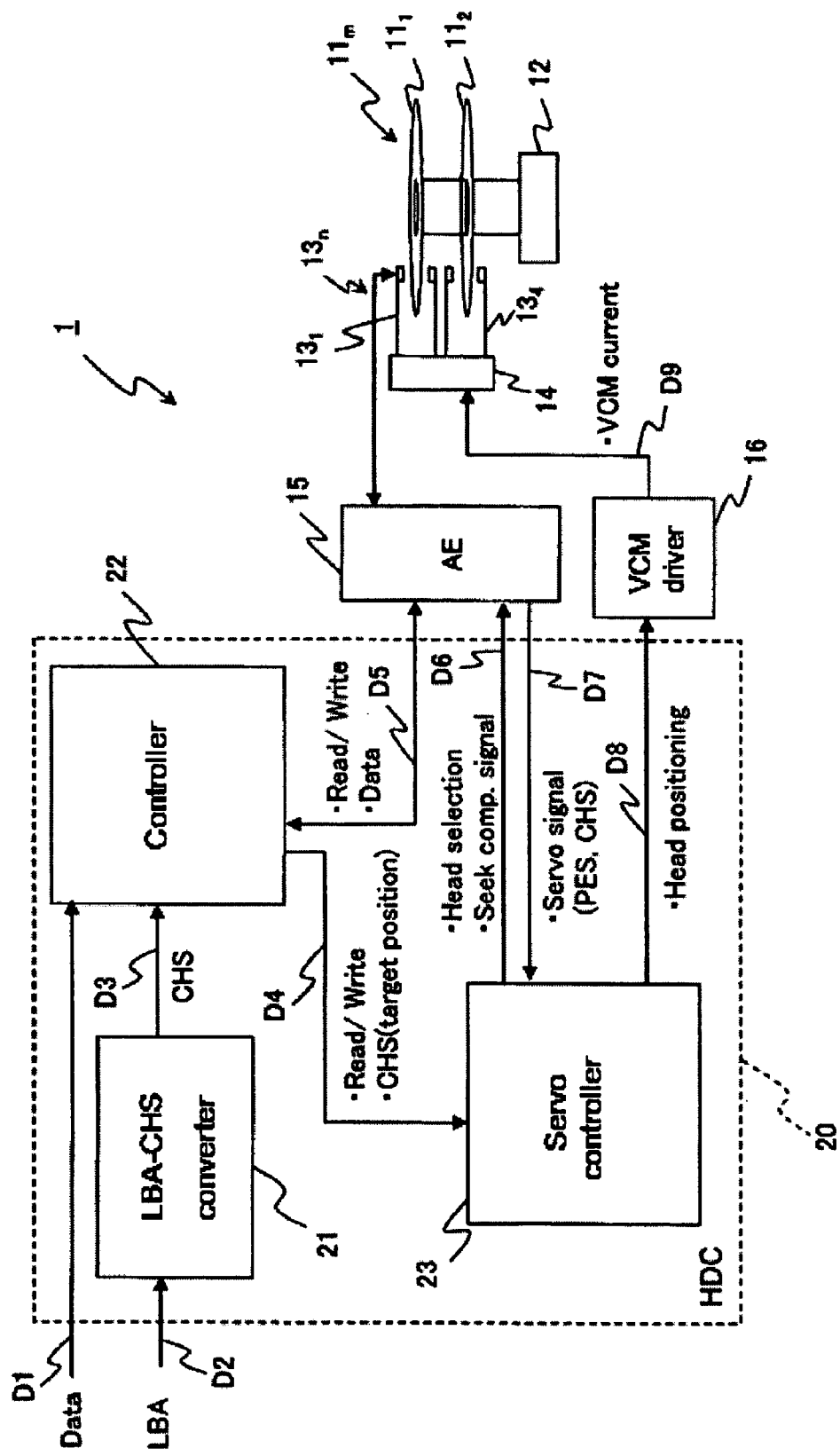
FIG. 2 is a block diagram that illustrates a hard disk drive according to one embodiment of the present invention.

The specific embodiment of the present invention will now be concretely described. FIG. 2 is a block diagram that illustrates a hard disk drive according to the embodiment of the present invention. The hard disk drive 1 comprises a signal processing circuit board and an HDA. As shown in FIG. 2, the HDA includes a plurality of magnetic disks $11_m$, which each have upper and lower recording surfaces onto which data is to be written, a spindle motor 12 for rotating the magnetic disks $11_m$, and a plurality of magnetic heads $13_n$, which are provided for the recording surfaces of the plurality of magnetic disks $11_m$. The hard disk drive according to the present embodiment has two magnetic disks $11_1$, $11_2$, and recording surfaces are provided on both sides of the magnetic disks $11_m$. Therefore, the magnetic heads $13_n$ according to the present embodiment have four recording surfaces, which are provided with four heads $13_1$ to $13_4$. One or more magnetic disks may be incorporated if the two sides of a disk each have a recording surface. Two or more magnetic disks may be incorporated if only one side of a disk has a recording surface.

The HDA further comprises a voice coil motor (VCM) 14, which supports the heads $13_n$ and turns in an integrated fashion, and an AE (arm electronics or arm electronic circuit) 15, which selects one magnetic head for data access from a plurality of magnetic heads $13_n$ and amplifies the read signal read by the selected magnetic head $13_n$ by a predetermined gain. The drive mechanism for the magnetic disks $11_m$, spindle motor 12, magnetic heads $13_n$, and VCM 14 and the AE 15 are enclosed in a housing (disc enclosure), which is not shown. The drive mechanism is controlled by a signal processing circuit, which is mounted on the signal processing circuit board.

The signal processing circuit includes a read/write (R/W) channel (not shown), a VCM driver 16 for controlling the VCM 14, and a hard disk controller (HDC) 20 for controlling the R/W channel and VCM driver.

The HDC 20 includes an LBA-CHS converter 21, a controller 22, and a servo controller 23. The LBA-CHS converter 21 is an address converter that receives a data LBA (D2) input, which is transferred from a host device (not shown), and converts the input to a CHS (cylinder number/head number/sector number) physical address. The controller 22 receives the data input (D1) that is transferred from the host device, and the CHS data input (D2) that is derived from the conversion by the LBA-CHS converter 21. The server controller 23 exercises servo control in compliance with the read/write instructions and CHS data (D4) from the controller 22.

In the LBA-to-CHS conversion by the LBA-CHS converter 21 according to the present embodiment, the LBAs are assigned as described above so that a single head's successive access area on a recording surface of each disk does not exceed one track unlike FIGS. 8(a), 8(b), 9(a), and 9(b). In other words, the LBAs fed from the host device are converted using a conversion table and conversion formula read from a ROM 33 with a view toward obtaining a physical format (data arrangement) that increases the number of head changes. The details will be given later.

The controller 22 exercises read/write control by supplying servo control data D4 to the servo controller 23, outputting write data, and supplying the read/write instructions to the AE 15 in accordance, for instance, with the write data D1 transferred from the host device, the read/write instructions issued by the host device, and the CHS data D3 generated by the LBA-CHS converter 21. The controller 22 functions as a head controller, which controls the access to the recording surfaces of the magnetic heads 13n in accordance with the CHS data D2, which is supplied from the LBA-CHS converter 21.

The R/W channel (not shown) is positioned between the controller 22 and AE 15. The R/W channel code-modulates the write data to be written onto the recording surfaces of the magnetic disks $11_m$ and outputs the resulting code-modulated write data to the AE 15. Further, the R/W channel receives the read signal that is read by the magnetic heads $13_n$, code-modulates the read signal, and enters the resulting code-modulated signal into the controller 22.

In compliance with the read/write instructions and CHS data D4 from the controller 22, the servo controller 23 outputs a head positioning signal D8 to the VCM driver 18 and supplies a head selection signal, which specifies the head for a write, to the AE 15. The AE 15 supplies a PES (position error signal) and CHS data D7 to the servo controller 23. In accordance with such a supply, the servo controller 23 outputs a seek completion signal (D6) to the AE 15.

Figure 3:
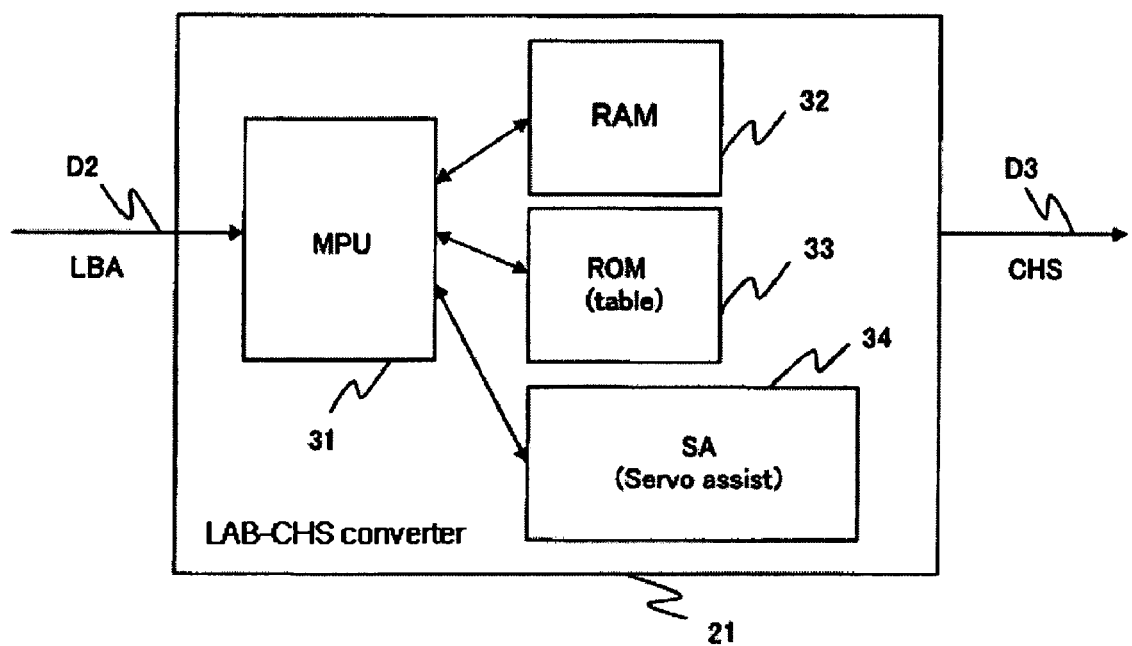
FIG. 3 is a block diagram that schematically illustrates an LBA-CHS converter of a hard disk drive according to one embodiment of the present invention.

The LBA-CHS converter 21 will now be described in detail. FIG. 3 is a block diagram that schematically illustrates the LBA-CHS converter 21. As shown in FIG. 3, the LBA-CHS converter 21 includes an MPU 31, a RAM 32, a ROM 33, and an SA (servo assist) 34. The MPU 31 reads a conversion table for LBA-to-CHS conversion from the ROM 33, and effects LBA-to-CHS conversion with conversion table parameters substituted into a predetermined conversion formula. The SA 34 is hardware that performs predetermined computations. In the present embodiment, the SA 34 not only exercises servo control but also provides assistance to a computation process that is performed for LBA-to-CHS conversion.

The CHS data, which is generated by the LBA-CHS converter 21, will now be described in detail. FIGS. 4(a), 4(b), and 4(c) illustrate a typical physical data arrangement according to the present embodiment. FIG. 4(a) is a schematic diagram that illustrates a disk. FIG. 4(b) is a schematic diagram that illustrates the relationship among the cylinders, heads, and disks. FIG. 4(c) is a schematic diagram that shows how the LBAs are arranged in relation to CHS values.

The present embodiment does not make a head change for each track as indicated in FIGS. 8(a) and 8(b), which were described earlier. In the present embodiment, four heads are sequentially selected to perform a write with one track of data divided into three segments. In other words, the data format employed by the present embodiment differs from the one shown in FIGS. 8(a), 8(b), 9(a), and 9(b), which is conventionally used for IT hard disk drives, and assigns LBAs so as to increase the number of head changes over the cylinders while assuring the minimum required sustained data rate. A zone format is used in the same manner as before.

First of all, the LBAs are assigned so that head selections are sequentially made for head changes in the Hd0, Hd1, Hd2, ..., HdN, (1 track seek), Hd0, Hd1, Hd2, ..., and HdN order and not in the conventional Hd0, Hd1, Hd2, ..., Hd (N-1), HdN, (1 track seek), HdN, Hd (N-1), Hd2, Hd1, Hd0, (1 track seek), and Hd0 order. The symbol N represents the maximum physical head number. When the heads are sequentially selected in a predetermined order as mentioned above, heads 0 and N are prevented from being successively used as compared to the other heads as indicated in the conventional example shown in FIGS. 8(a) and 8(b). Further, the successive access area on the recording surfaces of all simultaneously controlled heads does not exceed one track.

As shown in FIG. 4(a), one track is divided into three areas, which are designated A, B, and C. As indicated in FIG. 4(c), head 0 (Hd: 0) writes data into area A on a recording surface of disk 0 (Disk: 0) in cylinder 0 (Cyl: 0); head 1(Hd: 1) writes data into area B on another recording surface of disk 0 (Disk: 0) in cylinder 0 (Cyl: 0); head 2 (Hd: 2) writes data into area C on a recording surface of disk 1(Disk: 1) in cylinder 0 (Cyl: 0); and head 3 (Hd: 3) writes data into area A of disk 1(Disk: 1) in cylinder 0 (Cyl: 0). In this manner, all heads write data into or read data from partial tracks of areas A, B, and C, and a head change occurs. The present embodiment changes the head after writing or reading data for every ⅓ track.

When a write operation is completed for all disk numbers ranging from the minimum to the maximum, a write operation resumes with the minimum disk number. In this manner, all heads are used for a uniform length of time without using head 0 or 3 two times running. When partial tracks, which are obtained by dividing a track, are used as successive access areas, the resulting successive head use is less than one track so that the number of head changed can be increased. Further, if the track segment count for a head change in one track is equivalent to the number of heads N-1, head 0 can write data into area B, which is adjacent to area A, after head 3 writes into area A as shown in FIG. 4(c), and there is no need to wait for disk rotation. In reality, the LBAs are shifted in the direction of rotation or in a direction opposite to that of rotation for the time required for a head change or one track seek. Such an LBA shift is omitted from FIGS. 4(a), 4(b), and 4(c), and FIGS. 5, 6(a), 6(b), 6(c), and 7, which are referenced later.

Figure 4:
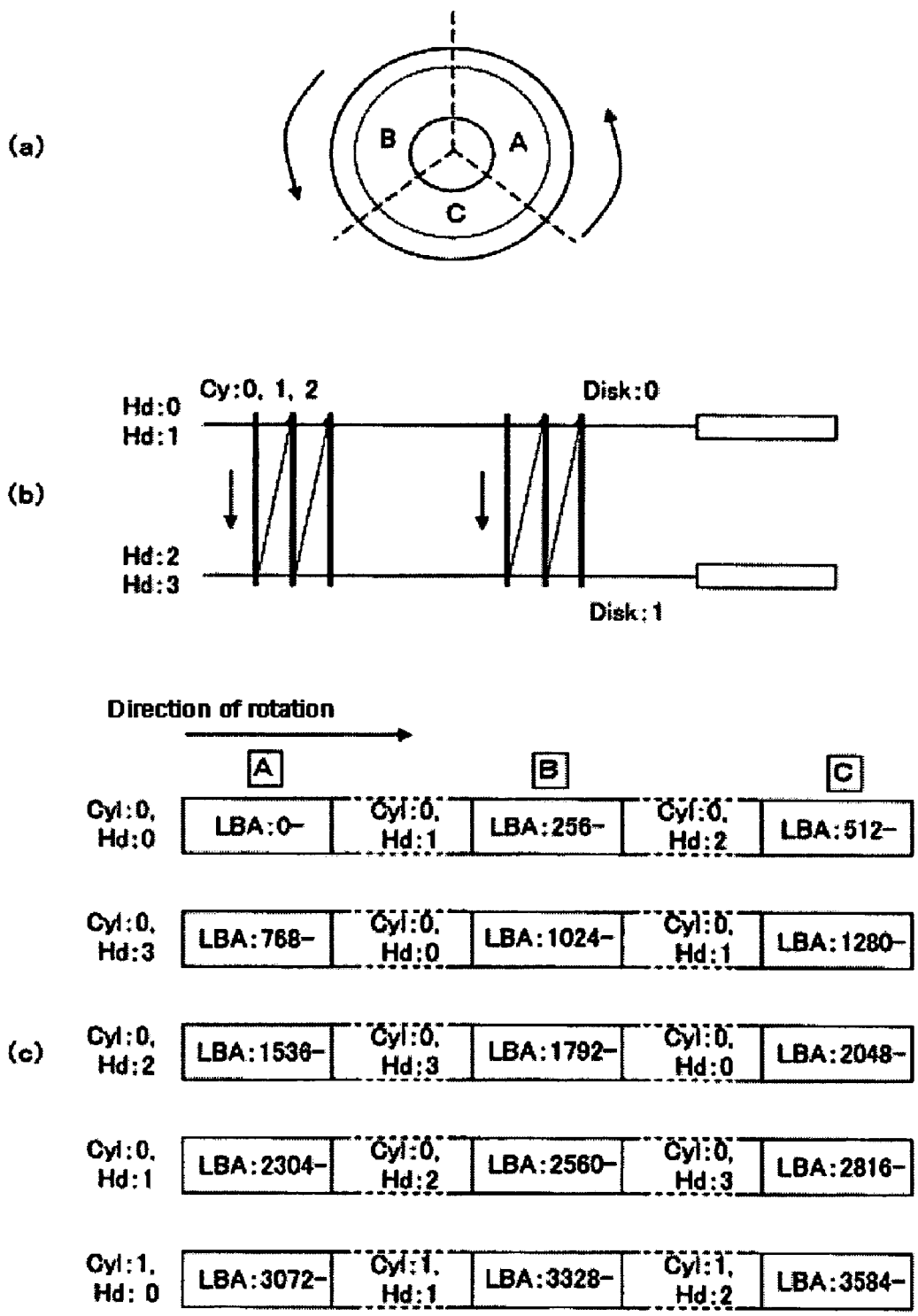
FIGS. 4(a), 4(b), and 4(c) illustrate a typical physical data arrangement in a hard disk drive according to one embodiment of the present invention.
Figure 5:
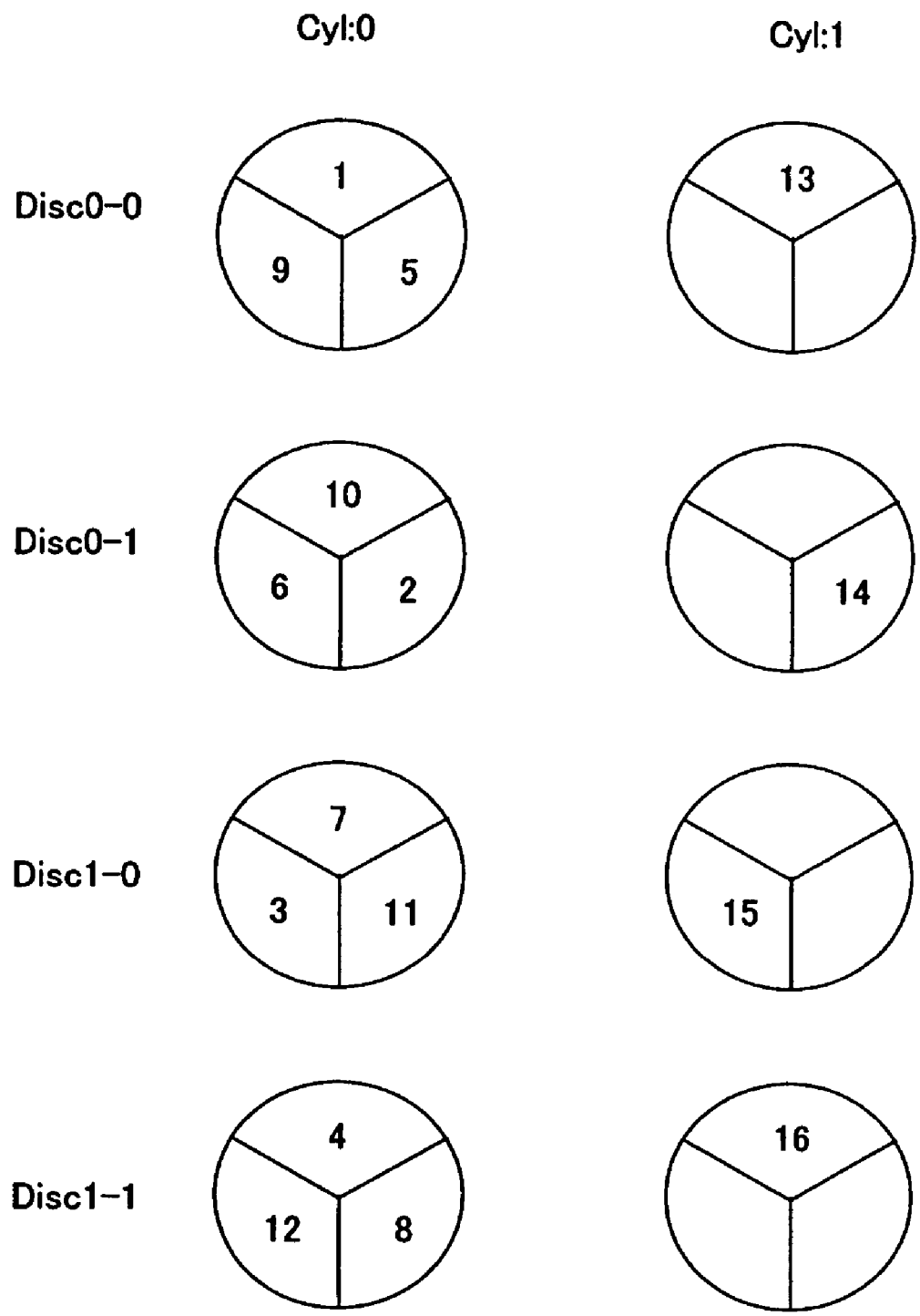
FIG. 5 schematically illustrates disk recording surfaces and their selection sequence for a situation where one track of a hard disk drive according to one embodiment of the present invention is divided into three areas for use.

FIG. 5 schematically illustrates the disk recording surfaces and their selection sequence for a situation where a track is divided into three areas for use as indicated in FIG. 4. Disk 0-0 is one recording surface of Disk 0, whereas Disk 0-1 is the other recording surface of Disk 0. In the example shown in the figure, heads numbered 0 (Hd: 0), 1(Hd: 1), 2 (Hd: 2), and 3 (Hd: 3) are sequentially selected to perform a read or write as they respectively correspond to Disk 0-0, Disk 0-1, Disk 1-0, and Disk 1-1. The numbers presented in the figure indicate the selection sequence. For example, while a disk makes three revolutions in order to sequentially select three partial areas of cylinder 0 (Cyl: 0), each recording surface is accessed three times. When, for instance, a head change occurs to move from area "1" of Disk 0-0 to area "2" of Disk 0-1 for accessing purposes, the LBAs are generally assigned with a sector shift invoked for a predetermined period of time required for a head change such as 0.5 ms as mentioned above. However, such a sector shift is omitted herein for convenience of explanation.

Figure 9:
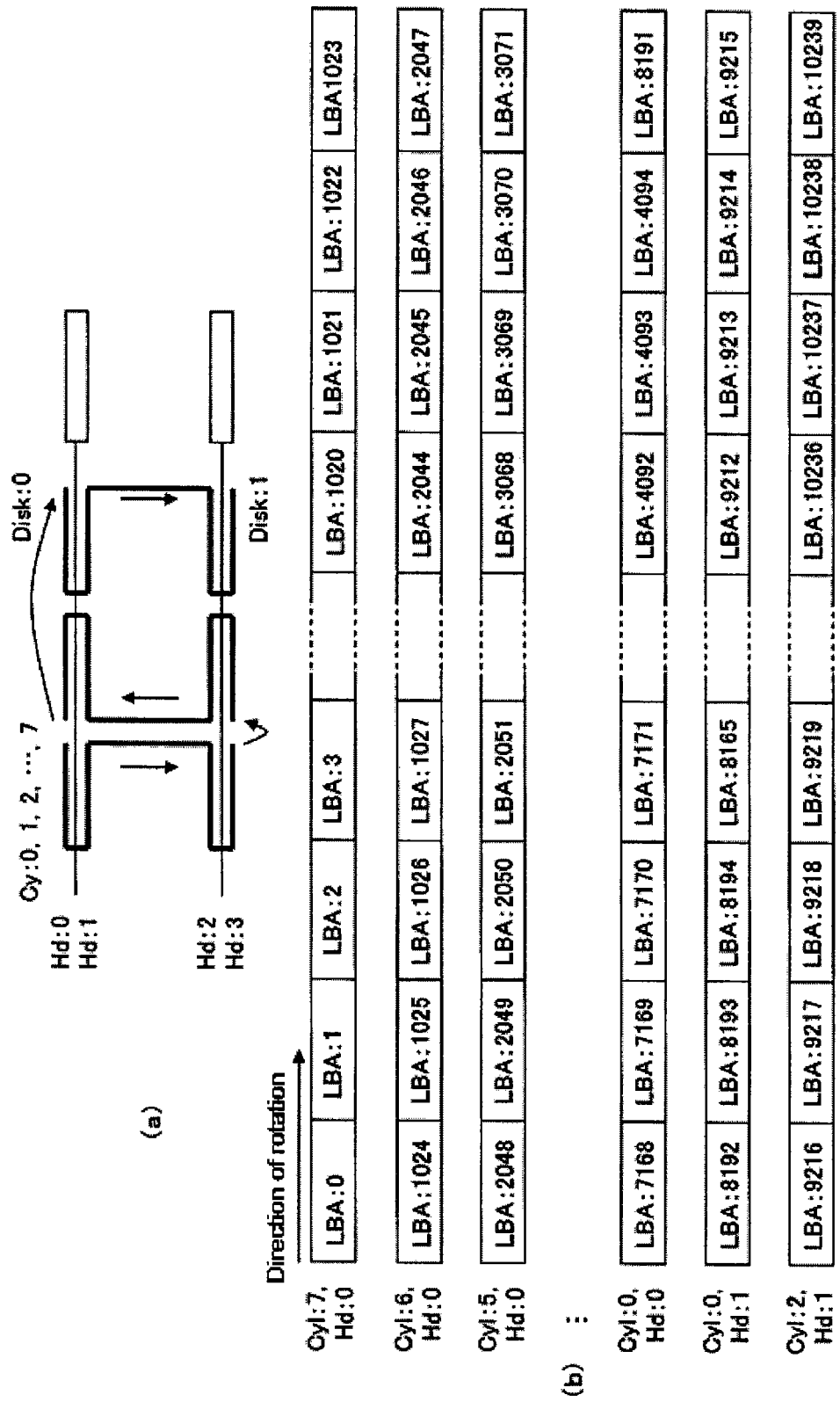
FIGS. 9(a) and 9(b) show another example of a conventional LBA assignment method.

Conventional head change methods are indicated in FIGS. 8(a), 8(b), 9(a), and 9(b). When the method indicated in FIGS. 9(a) and 9(b) is used, a head change occurs for every several tracks to several tens of tracks. When the method indicated in FIGS. 8(a) and 8(b) is used, on the other hand, a head change occurs for every 2 tracks. The continuous power application time for head elements, which constitute a head, can be shorter when the method shown in FIGS. 8(a) and 8(b) is used than when the method shown in FIGS. 9(a) and 9(b) is used. As indicated in FIG. 1, the head life can be extended by preventing a head element temperature rise when the continuous power application time for the head elements is short. In the present embodiment, therefore, a head change is made at least within one track in order to further reduce the continuous power application time. If an adequate sustained data rate is obtained, a head change is made within a period less than one track. The continuous power application time for the head elements can then be minimized to minimize the possibility of a head element temperature rise. This makes it possible to reduce the cumulative head failure occurrence count, thereby further extending the head life.

As a format for increasing the number of head changes, for example, the outer tracks can be divided into a relatively large number of areas while the LBAs are assigned so as to make frequent head changes. On the other hand, the inner tracks for which the sustained data rate decreases can be divided into a smaller number of areas. In this manner, premature head deterioration can be avoided while maintaining the minimum required sustained data rate.

In the case of an AV hard disk drive, the sustained data rate may be higher than the transfer rate at which image recording data is to be written. Such a high sustained data rate is not necessary if the write rate (sustained data rate) is 1 channel. More specifically, if 1-channel image recording data is to be written, the purpose is achieved when the sustained data rate required for a 1-channel image recording data write is attained at the innermost track of a disk. It means that the sustained data rate prevailing at the outer tracks is more than adequate. Therefore, the minimum required sustained data rate can be maintained at the outer tracks even when frequent head changes are made.

If, for instance, the employed zone format is such that 15 zones are provided, the tracks in the five outer track zones are divided into four segments, and a head change is made for every ¼ track. The tracks in the five middle track zones are divided into three tracks, and a head change is made for every ⅓ track. For the five inner track zones in which the sustained data rate decreases, the LBAs for each lap are assigned so that a track change occurs every track in the same manner as before. In the inner track zones, the amount of recordable data is originally small due to zone formatting. Therefore, the degree of head deterioration in the inner track zones is low. Consequently, substantially great head deterioration prevention effects can be produced overall if the possibility of head deterioration in the outer and middle track zones is minimized.

Figure 6:
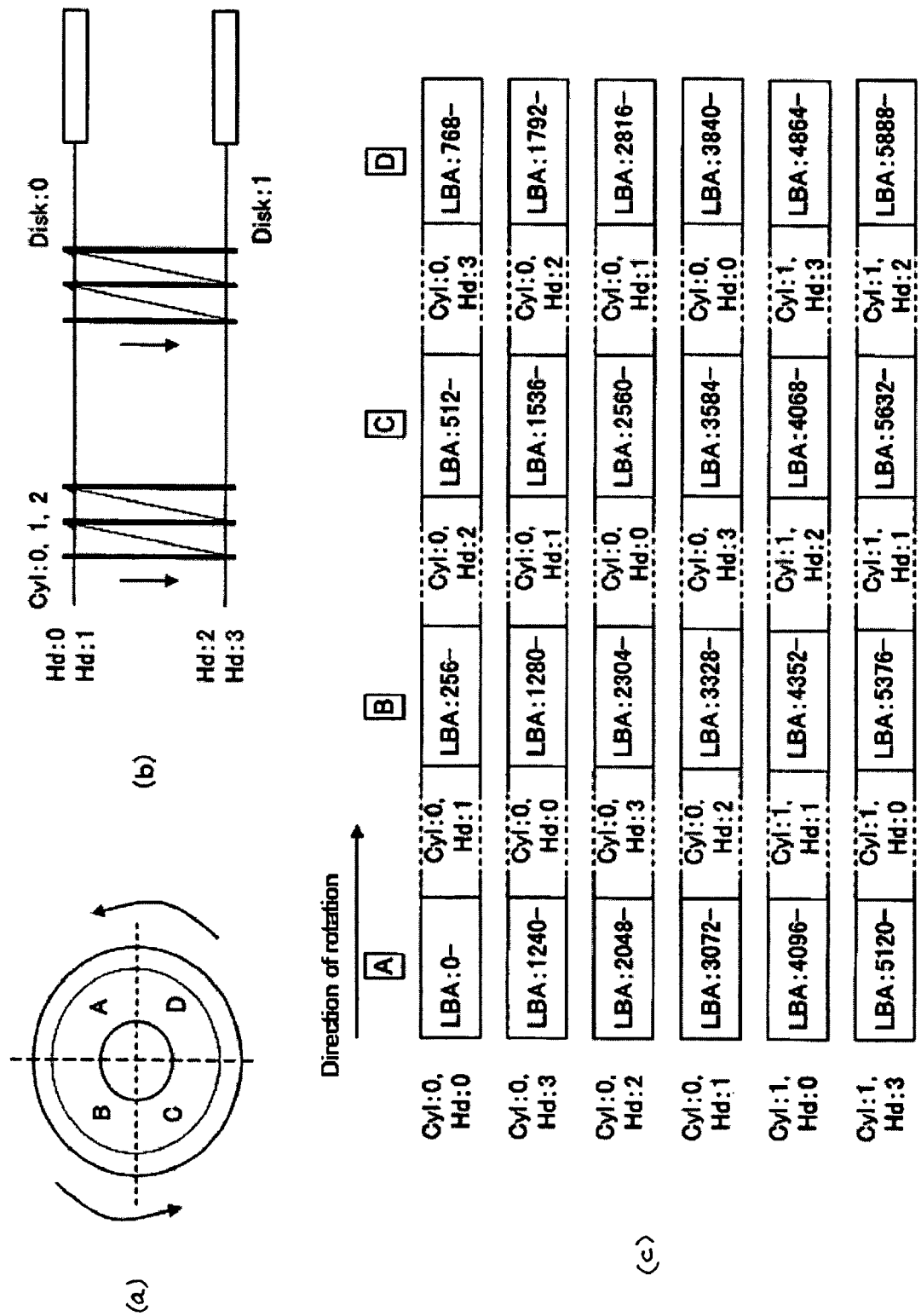
FIGS. 6(a), 6(b), and 6(c) illustrate another typical physical data arrangement in a hard disk drive according to one embodiment of the present invention.

FIGS. 6(*a*), 6(*b*), and 6(*c*) illustrate how the LBAs are assigned when a track is divided into four areas. FIG. 6(*a*) is a schematic diagram that illustrates a disk. FIG. 6(*b*) is a schematic diagram that illustrates the relationship among the cylinders, heads, and disks. FIG. 6(*c*) is a schematic diagram that shows how the LBAs are arranged in relation to CHS values. As shown in FIG. 6(*a*), one track of a disk is divided into areas A, B, C, and D. In the same manner as indicated above and as shown in FIGS. 6(*a*), 6(*b*), and 6(*c*), head changes occur so that the head number sequentially changes from the minimum to the maximum. After the head number is changed to the maximum, a head having the minimum head number is selected again. The present embodiment assumes that four heads are employed. Therefore, if, for instance, head 0 (Hd: 0) sequentially writes data into areas A through D, head 0 (Hd: 0) writes data again into areas A through D. To avoid such a data write, therefore, head 3 (Hd: 3) writes data for a ½ lap and not for a ¼ lap. In the example shown in FIG. 6(*c*), the LBAs are assigned so that data is successively written into data areas D and A in cylinder 0 (Cyl: 0). When the next LBA is assigned to area B on a recording surface of disk 0 (Disk: 0) in cylinder 0 (Cyl: 0), head 0 (Hd: 0) is selected at the next head change to write data into area B.

Head changes can then be made without suffering a rotational delay to avoid premature head deterioration, which may be caused by continuous use. In the currently used example, it is necessary to successively write or read two out of four partial areas (two partial areas correspond to a half lap) on a certain recording surface of each cylinder. However, the same conditions are imposed on all heads. No particular heads are heavily loaded. When compared to a situation where LBAs are successively assigned for one track, the number of head changes increases, thereby increasing the degree of premature head deterioration prevention.

Figure 7:
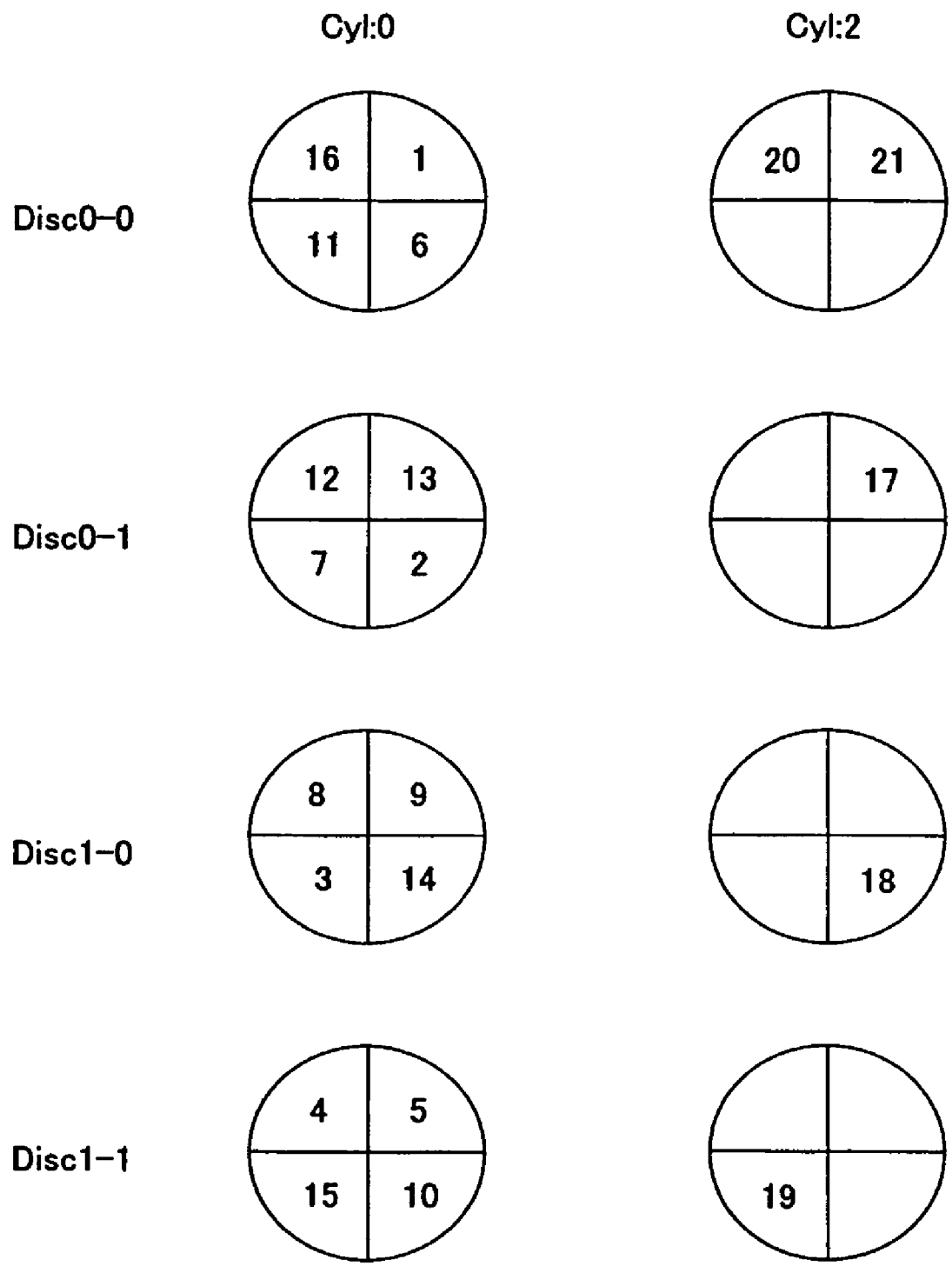
FIG. 7 is a schematic diagram that illustrates disk recording surfaces and their selection sequence for a situation where one track of a hard disk drive according to one embodiment of the present invention is divided into four areas for use.

FIG. 7 is a schematic diagram that illustrates disk recording surfaces and their selection sequence for a situation where one track is divided into four areas for use as shown in FIG. 6(*a*). As is the case with FIG. 5, Disk 0-0 is one recording surface of Disk 0, whereas Disk 0-1 is the other recording surface of Disk 0. In the example shown in the figure, disk recording surface selections are made in the Disk 0-0, Disk 0-1, Disk 1-0, and Disk 1-1 order. The numbers presented in the figure indicate the selection sequence.

As indicated in FIG. 7, a head change occurs when a ¼ track of a disk recording surface is accessed. In cylinder 0, two out of four partial areas of only the fourth recording surface (Disk 1-1) are successively accessed so that the successive access area is a ½ track. Disk 0-0 is accessed subsequently. It means that in cylinder 0 (Cyl: 0), a half-track successive write or read is performed in the Disk 1-1, Disk 1-0, and Disk 0-1 order, and that in cylinder 1, a half-track successive write or read is performed in the Disk 0-0, Disk 1-1, and Disk 1-0 order. In the other areas, however, a head change occurs for every ¼ track.

In the outermost track, head changes are made with the track divided into four areas as indicated in FIGS. 6(*a*), 6(*b*), 6(*c*), and 7. In a middle track, head changes are made with the track divided into three areas as indicated in FIGS. 4(*a*), 4(*b*), 4(*c*), and 5. The minimum required sustained data rate can be assured by varying the number of track segments as needed with the zone. Further, the possibility of head deterioration can be minimized by increasing the number of head changes in areas where the sustained data rate is more than adequate.

For AV and other hard disk drives that read/write a large amount of data continuously for a long period of time, the present embodiment assigns LBAs in such a manner that the number of head changes increases for a disk. This purpose can be accomplished simply by changing the conversion table and conversion formula for a conventional LBA-to-CHS conversion method that has been used for IT and other similar products. The possibility of head deterioration can be minimized in an extremely simple manner to enhance the hard disk drive reliability while maintaining the required performance characteristics.

When the technology disclosed by Patent Document 1 is used, it is necessary to provide means for storing the read time of each head and means for changing the head in accordance with the read time with a view toward ensuring that the heads are virtually equal in the cumulative read time. Therefore, the device turns out to be large in size with individual head control operations rendered complicated. However, the present embodiment minimizes the possibility of head deterioration simply by putting the conventional LBA-to-CHS conversion technique to practical use to change the manner of LBA assignment and without furnishing any special means for head deterioration prevention.

The present invention is not limited to the foregoing embodiment. It should be understood that variations may be made without departure from the scope and spirit of the present invention. If the hard disk drive is to be put to IT use as well as AV use, for example, the ROM 33, which is shown in FIG. 3, may alternatively be provided with a conversion table for IT use and a conversion table for AV use so that the user can choose a desired format from either of these conversion tables. Another alternative is to supply LBAs from the outside so that a head change occurs within one track without resort to the LBA-CHA converter 21.

In the above example in which four heads are employed, each track is divided into three or four partial tracks. However, each track may alternatively be divided into two segments to perform a successive write or read in half-track increments. In this case, too, the possibility of head deterioration can be minimized because the largest successive read/write area is one track. In the foregoing embodiment, head control is exercised so that the recording surfaces corresponding to the heads are accessed in the same order and for the same period of time. However, the order of recording surface access may not always be the same if all heads are equal in access time. Further, all the recording surfaces do not need to have partial tracks whose successive access area is less than one track. For example, only one out of five disks may have partial tracks. Furthermore, only the outer track zone of such a disk may have partial tracks.

In the foregoing embodiment, the LBAs are assigned to all recording surfaces of the disks to invoke frequent head changes. Alternatively, however, external control may be exercised so that head changes occur within one track. When head changes occur within one track at all times in a situation where external control is exercised, the possibility of head deterioration is minimized because the head temperature will not be raised by successive read/write operations.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A storage device comprising:
   one or more disks;
   a plurality of heads provided respectively for a plurality of recording surfaces of said one or more disks; and
   a head controller configured to exercise switchover control over said heads so that a successive access area in which said heads successively read or write data does not exceed one track;
   wherein each of said plurality of recording surfaces has tracks, which are divided into two or more partial areas, and
   wherein said head controller exercises control so that said successive access area of each head in one cylinder is said partial area,
   wherein each of said recording surfaces has (N−1) partial areas where N is the number of said heads (N is an integer equal to or greater than 2), and
   wherein said head controller uses said partial area as said successive access area and switches to another head each time one head accesses said partial area.

2. The storage device according to claim 1, wherein said head controller exercises control so that said successive access area of at least one head in one cylinder is less than one track.

3. The storage device according to claim 1, wherein said head controller provides said successive access area that is said partial area or two adjacent partial areas on the same recording surface.

4. The storage device according to claim 1, wherein each of said recording surfaces has a plurality of zones, which differ in the number of said partial areas.

5. The storage device according to claim 1, wherein outer tracks on each of said recording surfaces have a larger number of said partial areas than inner tracks.

6. The storage device according to claim 1, further comprising an address converter to convert a first address, which is transferred from a host device, into a second address, which is required for gaining access to said recording surfaces,
   wherein said head controller controls said each head's access to the associated recording surface in accordance with said second address.

7. The storage device according to claim 1, wherein said head controller exercises switchover control so that all of said heads are equal in the recording surface access time.

8. A storage device control method for controlling a storage device having a plurality of heads that are provided respectively for a plurality of recording surfaces of one or more disks, said method comprising:
   receiving data transferred from a host device; and
   exercising switchover control over said heads so that a successive access area in which said heads successively read or write data does not exceed one track when said data is to be written;
   wherein each of said plurality of recording surfaces has tracks, which are divided into two or more partial areas, and wherein switchover control is exercised over said heads so that said successive access area of each head in one cylinder is said partial area;
   wherein each of said recording surfaces has (N−1) partial areas where N is the number of said heads (N is an integer equal to or greater than 2), and
   wherein switchover control is exercised over said heads so as to use said partial area as said successive access area and switches to another head each time one head accesses said partial area.

9. The storage device control method according to claim 8, wherein switchover control is exercised over said heads so that said successive access area of at least one head in one cylinder is less than one track.

10. The storage device control method according to claim 8, wherein switchover control is exercised over said heads so that said successive access area is said partial area or two adjacent partial areas on the same recording surface.

11. The storage device control method according to claim 8, wherein each of said recording surfaces has a plurality of zones, which each have tracks that differ in the number of said partial areas from one zone to another.

12. The storage device control method according to claim 8, wherein outer tracks on each of said recording surfaces have a larger number of said partial areas than inner tracks.

13. The storage device control method according to claim 8,
   wherein a first address, which is transferred from a host device to indicate the address of said data, is converted into a second address, which is required for gaining access to said recording surfaces, and
   wherein switchover control is exercised over said heads so as to control each head's access to the associated recording surface in accordance with said second address.

14. The storage device control method according to claim 8, wherein switchover control is exercised over said heads so that all of said heads are equal in the recording surface access time.

* * * * *